Aug. 23, 1932.  E. SCHINKE  1,873,908
DIESEL ENGINE
Filed April 2, 1930  2 Sheets-Sheet 1

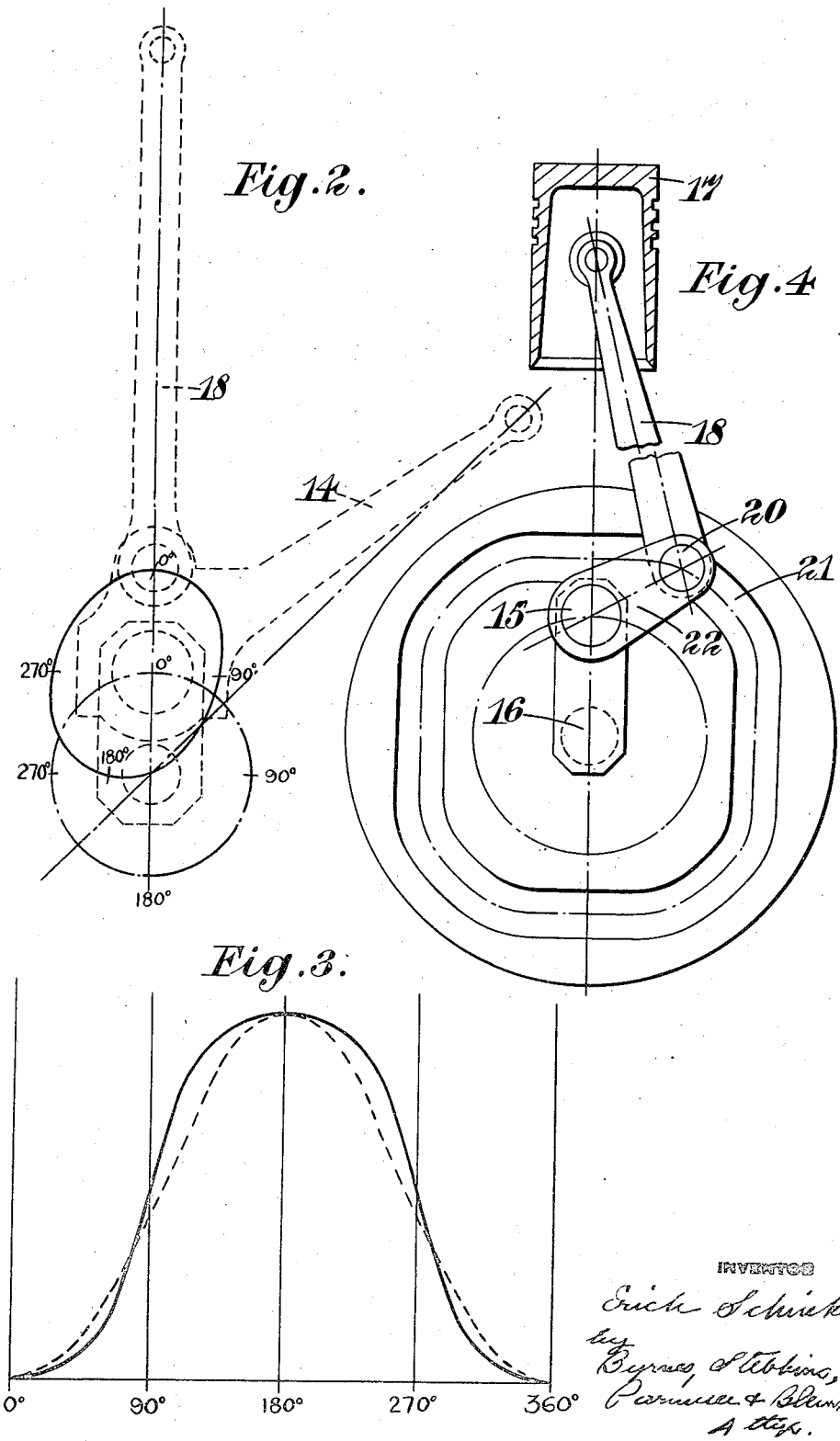

Patented Aug. 23, 1932

1,873,908

UNITED STATES PATENT OFFICE

ERICH SCHINKE, OF BERLIN, GERMANY, ASSIGNOR TO STANLEY HOPKINS, OF LONDON, ENGLAND

DIESEL ENGINE

Application filed April 2, 1930, Serial No. 440,960, and in Great Britain September 13, 1929.

This invention is for improvements in or relating to Diesel engines and has particular relation to engines having the so-called solid injection, or air injection, of fuel. The object of this invention is to provide a Diesel engine in which the speed may be materially increased above the speeds obtainable with the present designs and at the same time to maintain that economy of fuel consumption which is an outstanding feature of slow running Diesel engines.

Owing to the fact that the fuel utilized in Diesel engines does not burn with explosive violence as does petrol vapour, the economical speed range of such engines is very limited. The fuel requires a certain definite time in which to burn; this can be seen from examination of an indicator diagram, and this burning frequently extends until 41° after top dead centre. In order to lessen the time required for burning the charge completely, various schemes have been put forward, some of which have depended for their working on an increased turbulence in the cylinder head, and others on increasing the compression ratio. The latter scheme entails the disadvantage that all the working parts have to be substantially stiffer and heavier, and moreover, due to the increased temperature of compression, a certain amount of chemical decomposition has taken place in the charge, causing among other things, an objectionable smell from the exhaust. From the foregoing it will be seen that the limiting factor in engine speed is the time necessary for complete combustion and in order to increase the engine speed this invention seeks to provide a Diesel engine in which the combustion may take place in shorter time than heretofore.
To this end, the period of high compression in the engine is extended without putting up the compression ratio and without materially increasing the temperature of compression and thus avoiding the above-mentioned chemical decomposition. Preferably this increase in the high compression period should correspond to the difference in the time necessary for the combustion of the fuel utilized and that necessary for the combustion of volatile fuel such as petrol.

This invention therefore provides a Diesel engine characterized in that the crank and connecting-rod mechanism (or its equivalent) of the power cylinder is so arranged as to permit the piston, at the intermediate portion of the stroke, attaining a substantial increase in velocity as compared with the velocity permitted by the normal crank and connecting-rod mechanism when running at the same crank speed, and a corresponding increase in "dwell" at the top dead centre. The term "dwell" is utilized herein to describe the period of small piston movement and it is not meant to imply that the piston is absolutely stationary.

This increase in dwell at top dead centre may be attained in several ways, for example, the big end of the power cylinder connecting rod may be driven round a cam path of the requisite design, or the connecting rod may be articulated in known manner to a master rod whereof one end is pivoted to the crankpin and the other end is constrained to slide in guides in a predetermined path. The articulation of several connecting rods to a master rod is known in radial aircraft engines, but in these engines the articulation has been so arranged that the movement of each articulated piston shall approximate as closely as possible to the movement of the master piston. In contradistinction to this, the articulation in the Diesel engine according to this invention shall be so arranged that the piston motion shall deviate to a substantial extent from the normal piston motion, as has been described above.

Various mechanical constructions by which the required dwell at top dead centre may be obtained will now be described in detail by way of example with a reference to the accompanying drawings in which:—

Figure 2 is a diagram showing the paths of the crank-pin and wrist-pin in the engine shown in Figure 1;

Figure 3 is a diagram showing the piston displacement of a normal engine as compared with that of an engine according to this invention;

Figure 1:
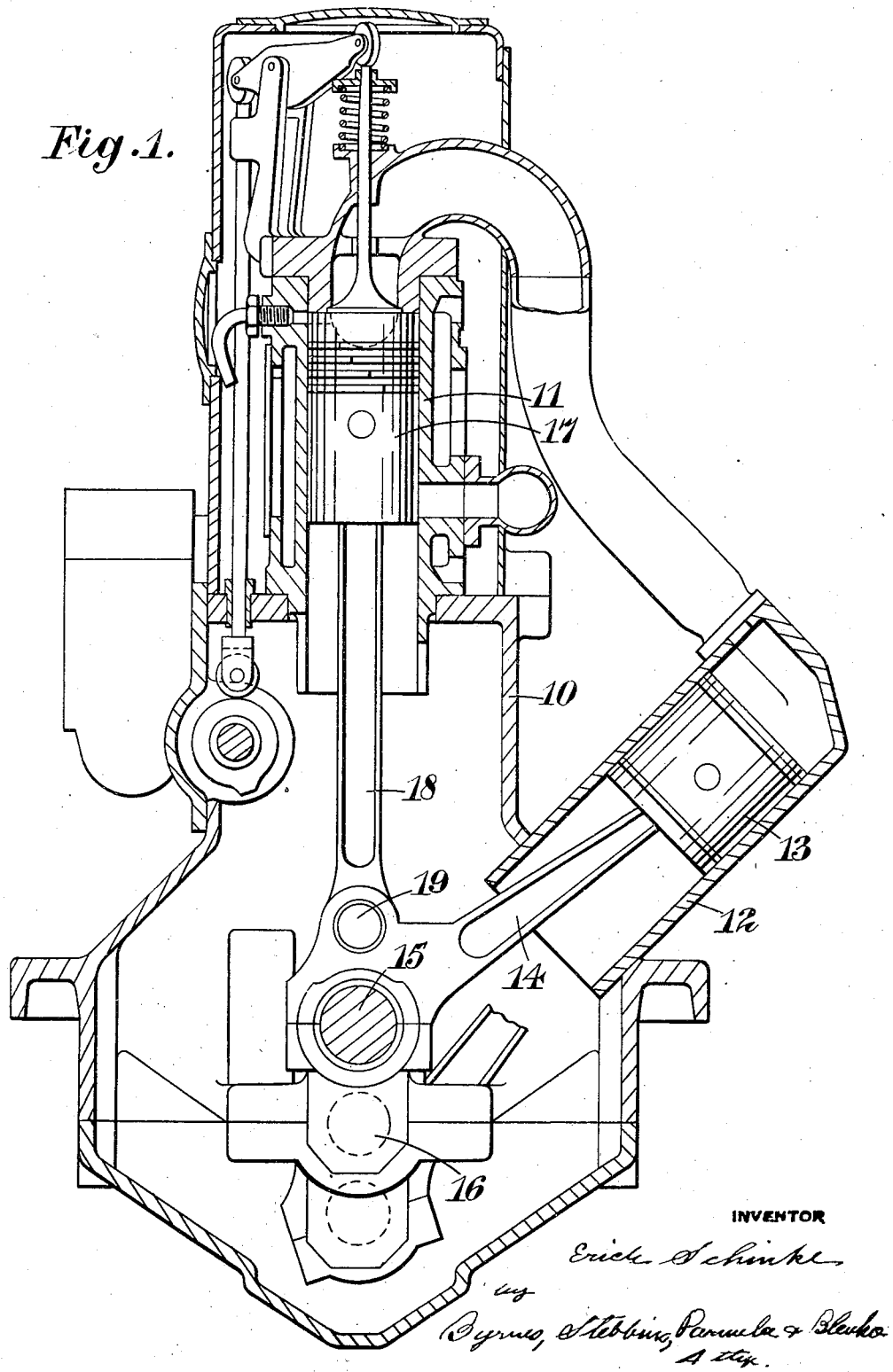
Figure 1 is a cross-section through a Diesel engine showing one arrangement of the connecting rod to obtain the required "dwell" at top dead centre;

Figure 4 shows an alternative arrangement of driving gear which gives a similar piston displacement curve to that illustrated in Figure 3.

Throughout this description like reference numerals indicate like parts.

Figure 1 shows a solid or air injection Diesel engine 10 having a power cylinder 11 and a compressor cylinder 12. The piston 13 of the compressor cylinder is provided with a connecting rod 14 which is pivoted upon the crank-pin 15 of the crank-shaft 16. The piston 17 of the power cylinder 11 is provided with a connecting rod 18 which is articulated by a wrist-pin 19 to the big end of the compressor connecting rod 14. Referring to Figure 2 it will be observed that the crank-pin 15 follows the normal circular path but the wrist-pin 19 is driven round a substantially elliptical path, thus causing the piston 17 of the working cylinder to dwell at top dead centre and lag behind that position which it would assume with a normal crank and connecting-rod mechanism during the initial portion of the explosion stroke. This effect is shown in Figure 3, in which figure piston displacement is plotted vertically against crank-shaft rotation, the compression ratio being identical in each case. The normal piston displacement curve is shown in dotted lines while that of a Diesel engine according to this invention is shown in full lines. It will be observed that there is a substantial increase in the period at top dead centre during which the charge is maintained at a high degree of compression.

Figure 4 illustrates an alternative method by which the piston displacement curve shown in Figure 3 may be obtained. The connecting rod 18 of the power cylinder is pivoted to a pin 20 which is driven around a stationary cam-path 21 by a link 22 which is pivoted to the crack pin 15.

The desired dwell at top dead centre may be obtained by many constructions of crank and connecting rod mechanism, the two constructions described above being only given as examples.

I claim:—

1. In an internal-combustion engine working on a Diesel, semi-Diesel or like cycle, the combination with the power cylinder and piston, of a crank-shaft, a crank-pin upon said shaft, a master connecting-rod pivoted to the crank-pin, a guide in which the free end of the master connecting-rod is slidable, and an articulated connecting-rod articulated to the big end of the master rod and carrying the piston aforesaid, so constructed and arranged as substantially to modify the piston movement and to produce a considerable increase in dwell at top dead centre and a corresponding increase in velocity at mid-stroke.

2. In an internal-combustion engine working on a Diesel, semi-Diesel, or like cycle, the combination with the power cylinder and piston, of a chank-shaft, a crank-pin on said shaft, a link pivoted upon the crank-pin, a guide in which the free end of the link is slidable, and an articulated connecting-rod pivoted to said link and carrying the piston aforesaid, so constructed and arranged as substantially to modify the piston movement and to produce a considerable increase in dwell at top and bottom dead centres and a corresponding increase in velocity at mid-stroke.

3. In an internal-combustion engine working on a Diesel, semi-Diesel or like cycle, the combination with the power cylinder and its piston, of a crank-shaft, a crank-pin on said shaft, a master connecting-rod pivoted on the crank-pin, a rectilinear guide in which the free end of the connecting-rod is slidable, spaced away from the axis of the power cylinder, and an articulated connecting-rod pivoted to the master-rod and carrying the piston aforesaid, so constructed and arranged as substantially to modify the piston movement and to produce a considerable increase in dwell at top and bottom dead centres and a corresponding increase in velocity at mid-stroke.

4. In an internal-combustion engine working on a Diesel, semi-Diesel or like cycle, the combination with the power cylinder and its piston, of a crank-shaft, a crank-pin on said shaft, a master connecting-rod pivoted on the crank-pin, a rectilinear guide in which the free end of the connecting-rod is slidable inclined at an angle to the horizontal, and an articulated connecting-rod pivoted to the master-rod and carrying the piston aforesaid, so constructed and arranged as substantially to modify the piston movement and to produce a considerable increase in dwell at top and bottom dead centres and a corresponding increase in velocity at mid-stroke.

5. In an internal-combustion engine working on a Diesel, semi-Diesel or like cycle, the combination with the power cylinder and piston, of a crank-shaft, a crank-pin upon said shaft, a master connecting-rod pivoted to the crank-pin, a rectilinear guide in which the free end of the connecting-rod is slidable inclined at an angle to the axis of the power cylinder, and an articulated connecting-rod articulated to the big end of the master-rod and carrying the piston aforesaid, so constructed and arranged as substantially to modify the piston movement and to produce a considerable increase in dwell at the top dead centre and a corresponding increase in velocity at mid-stroke.

6. In an internal-combustion engine working on a Diesel, semi-Diesel or like cycle, the combination with the power cylinder and piston, of a crank-shaft, a crank-pin upon said shaft, a master connecting-rod pivoted to the crank-pin, a rectilinear guide in which the free end of the connecting-rod is slidable inclined at an angle to the axis of the power cylinder, and an articulated connecting-rod articulated to the big end of the master-rod and carrying the piston aforesaid, so constructed and arranged as substantially to modify the piston movement and to produce a considerable increase in dwell at top and bottom dead centres and a corresponding increase in velocity at mid-stroke.

In testimony whereof I affix my signature.

ERICH SCHINKE.